US012802601B2

(12) United States Patent
Kang

(10) Patent No.: US 12,802,601 B2
(45) Date of Patent: Nov. 17, 2026

(54) DISPLAY DEVICE

(71) Applicant: LG Display Co., Ltd., Seoul (KR)

(72) Inventor: Seung-Hee Kang, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 399 days.

(21) Appl. No.: 18/545,785

(22) Filed: Dec. 19, 2023

(65) Prior Publication Data

US 2024/0257685 A1 Aug. 1, 2024

(30) Foreign Application Priority Data

Jan. 27, 2023 (KR) ........................ 10-2023-0011016

(51) Int. Cl.
*G09G 3/00* (2006.01)
*G06F 1/16* (2006.01)

(52) U.S. Cl.
CPC ........... *G09G 3/035* (2020.08); *G06F 1/1652* (2013.01); *G09G 2330/04* (2013.01)

(58) Field of Classification Search
CPC .. G06F 1/1652; H10K 59/124; H10K 59/131; H10K 59/873; H10K 59/88
See application file for complete search history.

(56) References Cited

U.S. PATENT DOCUMENTS

2018/0374912 A1 12/2018 Zhang et al.
2021/0376040 A1 12/2021 Youn et al.
2022/0310763 A1 9/2022 Cho et al.
2023/0098923 A1 * 3/2023 Hwang ................ H10K 50/865 257/40

FOREIGN PATENT DOCUMENTS

KR 10-2019-0035103 A 4/2019
KR 10-2019-0056663 A 5/2019
KR 10-2021-0147142 A 12/2021
KR 10-2022-0134839 A 10/2022

* cited by examiner

*Primary Examiner* — Daniel P Shook
(74) *Attorney, Agent, or Firm* — Seed Intellectual Property Law Group LLP

(57) ABSTRACT

The present disclosure relates to a display device, and the display device according to the embodiment of the present disclosure includes a substrate including a display area and a non-display area, the non-display area including a bending area, a first area disposed at one side of the bending area, and a second area disposed at the other side of the bending area, a plurality of pads disposed on an upper portion of the substrate in the first area and including a first pad, a circuit element configured to supply electric power at least to the first pad among the plurality of pads, a plurality of signal lines disposed on the upper portion of the substrate in the bending area and including a first signal line electrically connected to the first pad, the plurality of signal lines being electrically connected to the plurality of pads, respectively, a planarization layer configured to cover the plurality of signal lines, and a shield layer disposed over the planarization layer and configured to at least cover the first signal line among the plurality of signal lines.

23 Claims, 13 Drawing Sheets

DISPLAY DEVICE

CROSS-REFERENCE TO RELATED APPLICATIONS

This application claims the priority of Korean Patent Application No. 10-2023-0011016 filed on Jan. 27, 2023, in the Korean Intellectual Property Office, the disclosure of which is incorporated herein by reference.

BACKGROUND

Technical Field

The present specification relates to a display device, and more particularly, to a display device that minimizes a degree to which static electricity made by ions generated in an upper layer in a bending area affects a line.

Description of the Related Art

Display devices, which visually display electrical information signals, are being rapidly developed in accordance with the entry into the information era. Various studies are being continuously conducted to develop a variety of display devices which are thin and lightweight, consume low power, and have improved performance.

Among the display devices, an organic light-emitting display (OLED) device does not require a separate light source, unlike a liquid crystal display (LCD) device having a backlight. The advantages of the organic light-emitting display device are that the organic light-emitting display device may be manufactured to be lightweight and thin, and power consumption is low because the organic light-emitting display device may be operated by a low voltage. Among other things, the organic light-emitting display device may have an autonomous light-emitting element, and layers of the organic light-emitting display device may be configured by thin organic films. The advantages of the organic light-emitting display device are that the organic light-emitting display device may have excellent flexibility and elasticity in comparison with other display devices and thus be implemented as a flexible display device.

In general, an organic light-emitting display panel includes a substrate, an anode, a bank, a light-emitting layer, a cathode, and a sealing layer. A touch electrode may be formed on the sealing layer, and a micro-coating layer may be formed on an upper portion of the touch electrode in a bending area.

Meanwhile, in the bending area, mobile ions may be generated from layers, such as the micro-coating layer, that constitute a structure of the display device. When a voltage is applied to the ions, an electric field may be generated. The electric field may affect signals of signal lines disposed in the bending area.

BRIEF SUMMARY

An object to be achieved by the present disclosure is to provide a display device capable of minimizing a degree to which an electric field generated by mobile ions affects a signal line or inhibiting the electric field generated by the mobile ions from affecting the signal line.

Objects of the present disclosure are not limited to the above-mentioned objects, and other objects, which are not mentioned above, can be clearly understood by those skilled in the art from the following descriptions.

According to an aspect of the present disclosure, a display device includes a substrate including a display area and a non-display area, the non-display area including a bending area, a first area disposed at a first side of the bending area, and a second area disposed at a second side of the bending area, a plurality of pads disposed on an upper portion of the substrate in the first area and including a first pad, a circuit element configured to supply electric power at least to the first pad among the plurality of pads, a plurality of signal lines disposed on the upper portion of the substrate in the bending area and including a first signal line electrically connected to the first pad, the plurality of signal lines being electrically connected to the plurality of pads, respectively, a planarization layer configured to cover the plurality of signal lines and a shield layer disposed over the planarization layer and configured to at least cover the first signal line among the plurality of signal lines.

Other detailed matters of the exemplary embodiments are included in the detailed description and the drawings.

The display device according to the embodiment of the present specification may minimize a degree to which the electric field generated by the mobile ions affects the signal line or inhibit the electric field generated by the mobile ions from affecting the signal line. Therefore, it is possible to provide the effect of improving the reliability of the display device by suppressing an electric corrosion defect of the line in the bending area.

The effects according to the present disclosure are not limited to the contents exemplified above, and more various effects are included in the present specification.

BRIEF DESCRIPTION OF THE SEVERAL VIEWS OF THE DRAWINGS

The above and other aspects, features and other advantages of the present disclosure will be more clearly understood from the following detailed description taken in conjunction with the accompanying drawings, in which.

DETAILED DESCRIPTION OF THE EMBODIMENT

Figure 1:
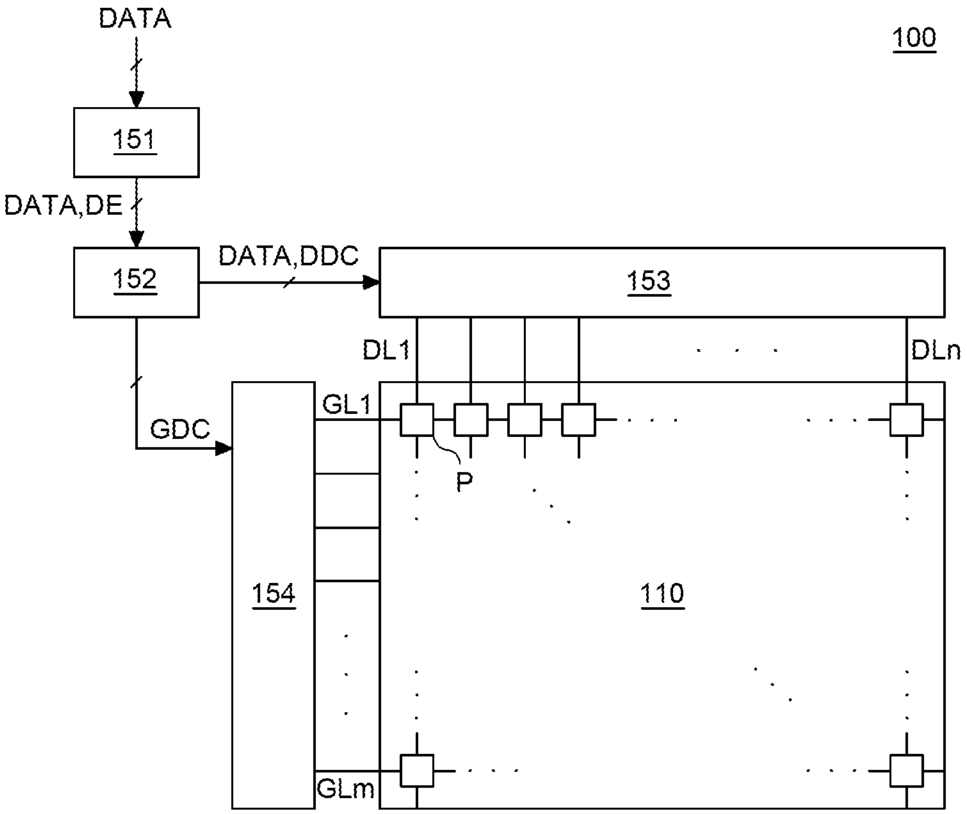
FIG. 1 is a block diagram of a display device according to embodiments of the present specification.

Advantages and characteristics of the present disclosure and a method of achieving the advantages and characteristics will be clear by referring to exemplary embodiments described below in detail together with the accompanying drawings. However, the present disclosure is not limited to the exemplary embodiments disclosed herein but will be implemented in various forms. The exemplary embodiments are provided by way of example only so that those skilled in the art can fully understand the disclosures of the present disclosure and the scope of the present disclosure.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only". Any references to singular may include plural unless expressly stated otherwise.

In construing an element, the element is construed as including an error range although there is no explicit description.

In describing a position relationship, for example, when a position relation between two parts is described as "on," "over," "under," and "next" one or more other parts may be disposed between the two parts unless "just(ly)" or- "direct (ly)" is used.

In describing a time relationship, for example, when the temporal order is described as 'after~', 'subsequent~', 'next~', and 'before~', a case which is not continuous may be included unless "just(ly)" or "direct(ly)" is used.

It will be understood that, although the terms "first," "second," etc., may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing the elements of the present disclosure, terms such as first, second, A, B, (a), (b), etc., may be used. Such terms are used for merely discriminating the corresponding elements from other elements and the corresponding elements are not limited in their essence, sequence, precedence, or number by the terms. It will be understood that when an element is referred to as being "coupled" or "connected to" another element, it can be directly coupled or directly connected to the other element, or intervening other elements may be present therebetween.

The term "at least one" should be understood as including any and all combinations of one or more of the associated listed elements. For example, the meaning of "at least one of a first element, a second element, and a third element" denotes the combination of all elements proposed from two or more of the first element, the second element, and the third element as well as the first element, the second element, or the third element.

In the present disclosure, examples of a display device may include a narrow-sense display device such as a quantum dot module, an organic light emitting diode (OLED) module or a liquid crystal module (LCM) having a display panel and a driver for driving the display panel. Also, examples of the display device may include a set device (or a set apparatus) or a set electronic apparatus such as a notebook computer, a TV, a computer monitor, an equipment apparatus including an automotive apparatus or another type of apparatus for vehicles, or a mobile electronic device such as a smartphone or an electronic pad, which is a complete product (or a final product) including an LCM, an OLED module, and a QD module.

Therefore, in the present disclosure, examples of the display device may include a narrow-sense display device itself, such as an LCM, an OLED module, and a QD module, and a set device, which is a final consumer device or an application product including the LCM, the OLED module, and the QD module.

In some embodiments, an LCM, an OLED module, and a QD module including a display panel and a driver may be referred to as a narrow-sense display device, and an electronic device, which is a final product including an LCM, an OLED module, and a QD module may be referred to as a set device. For example, the narrow-sense display device may include a display panel, such an LCM, an OLED module, or a QD module, and a source printed circuit board (PCB), which is a controller for driving the display panel. The set device may further include a set PCB, which is a set controller electrically connected to the source PCB to overall control the set device.

A display panel applied to embodiments of the present disclosure may use any type of display panel, including a liquid crystal display panel, an organic light emitting diode (OLED) display panel, a quantum dot (QD) display panel, and an electroluminescent display panel. The display panel of the embodiment is not limited to a specific display panel capable of bezel bending with a flexible substrate for an organic light emitting diode (OLED) display panel and a lower back plate support structure. Also, a shape or a size of a display panel applied to a display device according to these embodiments is not limited.

In an example where the display panel is the organic light emitting display panel, the display panel may include a plurality of gate lines, data lines, and pixels respectively provided in intersections of the gate lines and the data lines. Also, the display panel may include an array including a thin film transistor (TFT), which is an element for selectively applying a voltage to each of the pixels, a light emitting element layer on the array, and an encapsulation substrate or an encapsulation layer disposed on the array to cover the light emitting element layer. The encapsulation substrate may protect the TFT and the light emitting element layer from an external impact and may prevent water or oxygen from penetrating into the light emitting element layer. Also, a layer provided on the array may include an inorganic light emitting layer, for example, a nano-sized material layer, a quantum dot, or the like.

Features of various embodiments of the present disclosure may be partially or overall coupled to or combined with each other, and may be variously inter-operated with each other and driven technically. Embodiments of the present disclosure may be carried out independently from each other, or may be carried out together in co-dependent relationship.

Hereinafter, an exemplary embodiment of the present disclosure will be described as below through the accompanying drawings and an exemplary embodiment. The scale of components illustrated in the drawing is not limited to the scale illustrated in the drawing because the scale has a different than an actual scale for the convenience of explanation.

FIG. 1 is a block diagram of a display device according to embodiments of the present specification.

With reference to FIG. 1, a display device 100 according to embodiments of the present specification may include an image processor 151, a timing controller 152, a data driver 153, a gate driver 154 and a display panel 110.

In this case, the image processor 151 may output a data signal DATA, a data enable signal DE, and the like supplied from the outside. The image processor 151 may output one or more of a vertical synchronizing signal, a horizontal synchronizing signal, and a clock signal in addition to the data enable signal DE.

The timing controller 152 receives the data signal DATA in addition to the data enable signal DE or the driving signals including the vertical synchronizing signal, the horizontal synchronizing signal, and the clock signal from the image processor 151. Based on the driving signal, the timing controller 152 may output a gate timing control signal GDC for controlling an operation timing of the gate driver 154 and output a data timing control signal DDC for controlling an operation timing of the data driver 153.

In addition, in response to the data timing control signal DDC supplied from the timing controller 152, the data driver 153 may sample and latch the data signal DATA supplied from the timing controller 152, convert the data signal DATA into a gamma reference voltage, and output the gamma reference voltage. The data driver 153 may output the data signal DATA through data lines DL1 to DLn.

In addition, the gate driver 154 may output the gate signal while shifting a level of the gate voltage in response to the gate timing control signal GDC supplied from the timing controller 152. The gate driver 154 may output the gate signal through gate lines GL1 to GLm.

The display panel 110 may display an image as subpixels P emit light in response to the data signal DATA and the gate signal supplied from the data driver 153 and the gate driver 154. A detailed structure of the subpixel P will be described below with reference to FIGS. 2 and 6.

Figure 2:
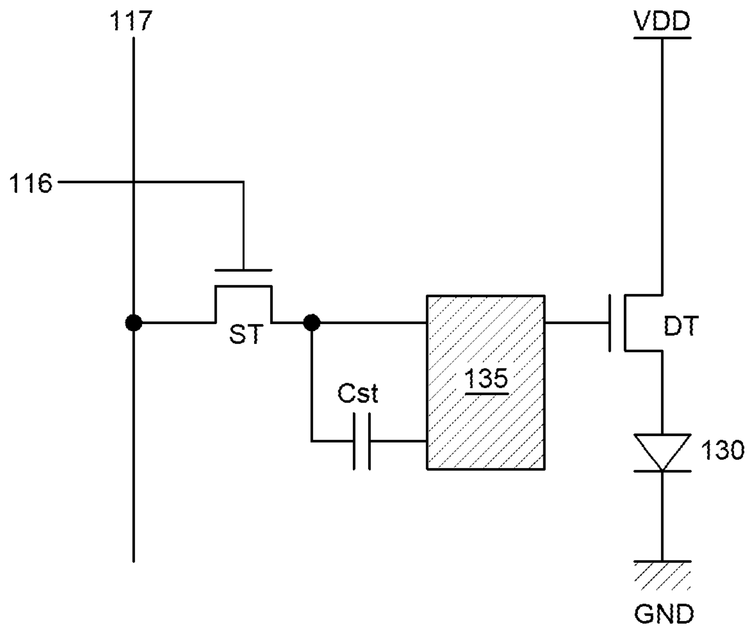
FIG. 2 is a circuit diagram of a subpixel of the display device of the embodiments of the present specification.

FIG. 2 is a circuit diagram of the subpixel of the display device of the embodiments of the present specification.

With reference to FIG. 2, the subpixel of the display device according to the embodiments of the present specification may include a switching transistor ST, a driving transistor DT, a compensating circuit 135, and a light-emitting element 130.

The light-emitting element 130 may operate to emit light based on a drive current produced by the driving transistor DT.

The switching transistor ST may perform a switching operation so that the data signal supplied through a data line 117 is stored, as a data voltage, in a capacitor Cst in response to the gate signal supplied through a gate line 116.

The driving transistor DT may operate such that a predetermined drive current flows between a high-potential power line VDD and a low-potential power line GND while corresponding to data voltage stored in the capacitor Cst.

The compensating circuit 135 is a circuit for compensating for a threshold voltage or the like of the driving transistor DT. The compensating circuit 135 may include one or more thin-film transistors and one or more capacitors. The compensating circuit 135 may have very various configurations depending on a compensation method.

The subpixel illustrated in FIG. 2 has a 2T(Transistor)1C (Capacitor) structure including the switching transistor ST, the driving transistor DT, the capacitor Cst, and the light-emitting element 130. However, in case that the compensating circuit 135 is added, the subpixel may have various configurations such as 3T1C, 4T2C, 5T2C, 6T1C, 6T2C, 7T1C, 7T2C, or the like.

Figure 3:
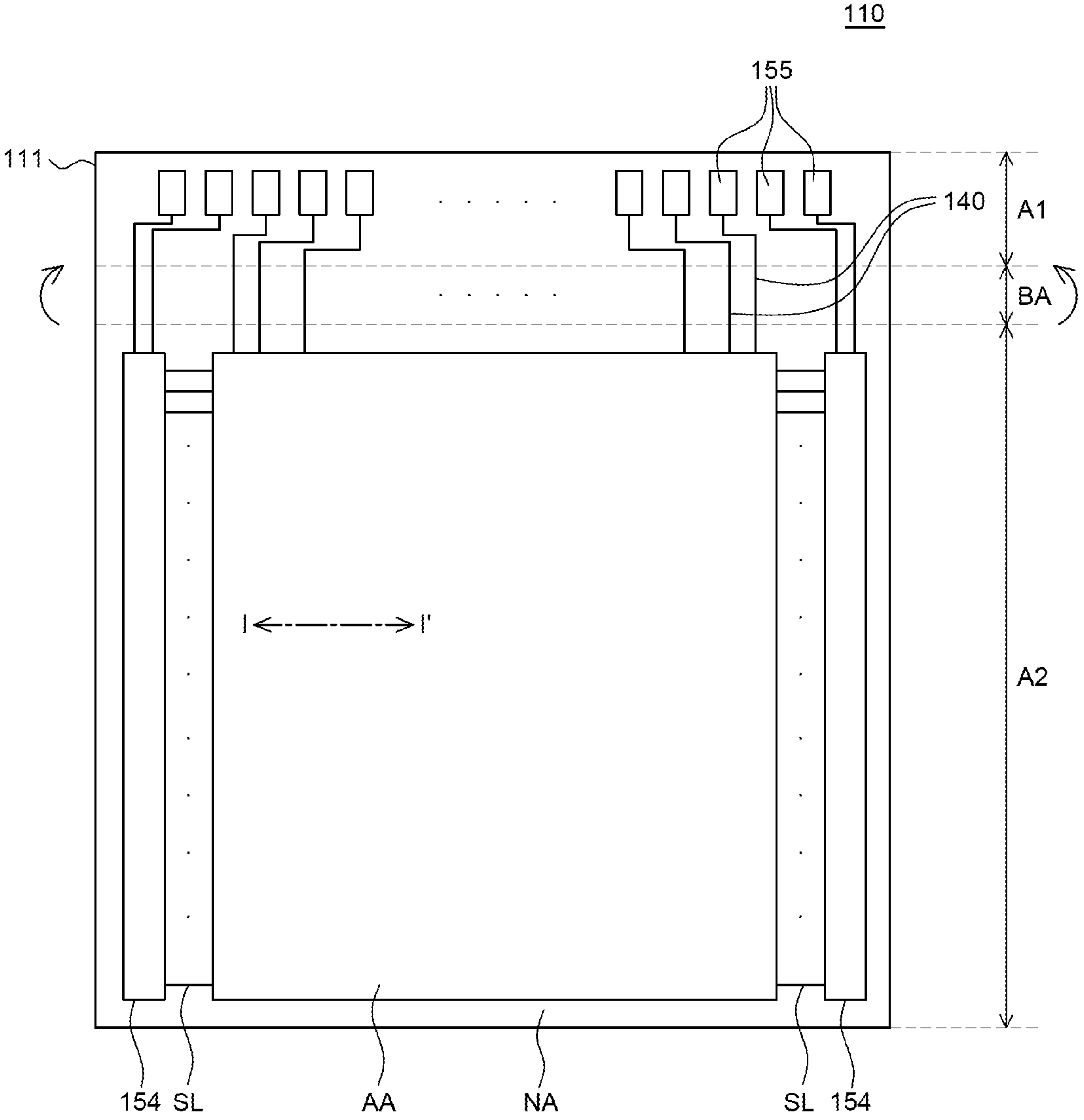
FIG. 3 is a top plan view of the display device according to the embodiments of the present specification.

FIG. 3 is a top plan view of the display device according to the embodiments of the present specification.

In particular, FIG. 3 illustrates an example in which a substrate 111 of the display device according to the embodiments of the present specification is not bent.

With reference to FIG. 3, the display device may include a display area AA, and a non-display area NA configured to surround an edge of the display area AA. In the display area AA, a pixel is disposed on the flexible substrate 111 and actually emits light through a thin-film transistor and a light-emitting element.

The non-display area NA of the substrate 111 includes a bending area BA. A circuit, such as the gate driver 154 for operating the display device, and various signal lines, such as a scan line SL (or a gate line), may be disposed in the non-display area NA.

The circuit for operating the display device may be disposed on the substrate 111 in a gate-in-panel (GIP) manner or connected to the substrate 111 in a tape-carrier-package (TCP) or chip-on-film (COF) manner.

A plurality of pads 155 may be disposed at one side of the substrate 111 in the non-display area NA, and an external module may be bonded.

Meanwhile, the bending area BA may be formed by bending a part of the non-display area NA of the substrate 111 in a bending direction indicated by the arrow.

The non-display area NA of the substrate 111 may be an area in which lines and a drive circuit for operating a screen are disposed. Because the non-display area NA is not an area in which images are displayed, the non-display area NA need not be visually recognized from a top surface of the substrate 111. Therefore, it is possible to reduce a bezel area while ensuring an area for the line and the drive circuit by bending a partial area of the non-display area NA of the substrate 111.

As described above, the substrate 111 may include the display area AA and the non-display area NA, and the non-display area NA may include the bending area BA. In addition, the substrate 111 may include a first area A1 disposed at a first side of the bending area BA, and a second area A2 disposed at a second side of the bending area BA. In other words, the bending area BA may be disposed between the first area A1 and the second area A2, and the first area A1 may include a pad area PA (see FIG. 4) to be described below.

Various lines may be formed on the substrate 111. The lines may also be formed in the display area AA of the substrate 111. A plurality of signal lines 140 formed in the non-display area NA may connect the drive circuit, the gate driver, and the data driver and transmit signals.

The plurality of signal lines 140 may each be made of an electrically conductive material. The plurality of signal lines 140 may each be made of an electrically conductive material having excellent flexibility in order to reduce the occurrence of cracks when the substrate 111 is bent. For example, the plurality of signal lines 140 may each be made of an electrically conductive material such as gold (Au), silver (Ag), or aluminum (Al) that has excellent flexibility. The plurality of signal lines 140 may each be made of one of various electrically conductive materials used for the display area AA. In addition, the plurality of signal lines 140 may each be made of an alloy of molybdenum (Mo), chromium (Cr), titanium (Ti), nickel (Ni), neodymium (Nd), copper (Cu), silver (Ag), and magnesium (Mg).

The plurality of signal lines 140 may each be configured as a multilayer structure including various electrically conductive materials. For example, the plurality of signal lines 140 may each be configured as a three-layer structure including titanium (Ti), aluminum (Al), and titanium (Ti). However, the present disclosure is not limited thereto.

A tensile force is applied to the plurality of signal lines 140 formed in the bending area BA in case that the plurality of signal lines 140 is bent. For example, the highest tensile force is applied to the plurality of signal lines 140 extending in a direction identical to the bending direction, which may cause cracks or disconnection. Therefore, the plurality of signal lines 140 is not disposed to extend in the bending direction. At least some of the plurality of signal lines 140 may be disposed to extend in a direction different from the bending direction, e.g., in an oblique direction, which may minimize a tensile force.

The plurality of signal lines 140 disposed in the bending area BA may each be formed in various shapes and formed in a trapezoidal wave shape, a triangular wave shape, a serrated wave shape, a sine wave shape, an omega (Ω) shape, a rhombic shape, or the like.

Figure 4:
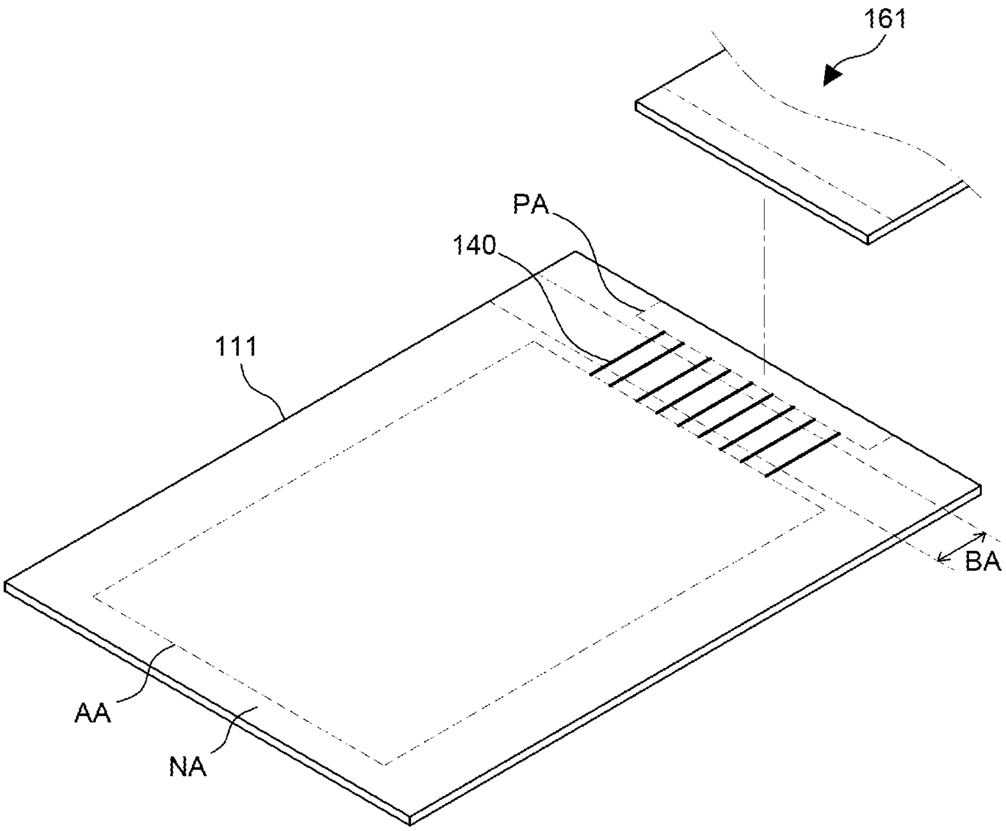
FIG. 4 is a perspective view of the display device according to the embodiments of the present specification.

FIG. 4 is a perspective view of the display device according to the embodiments of the present specification.

Figure 5:
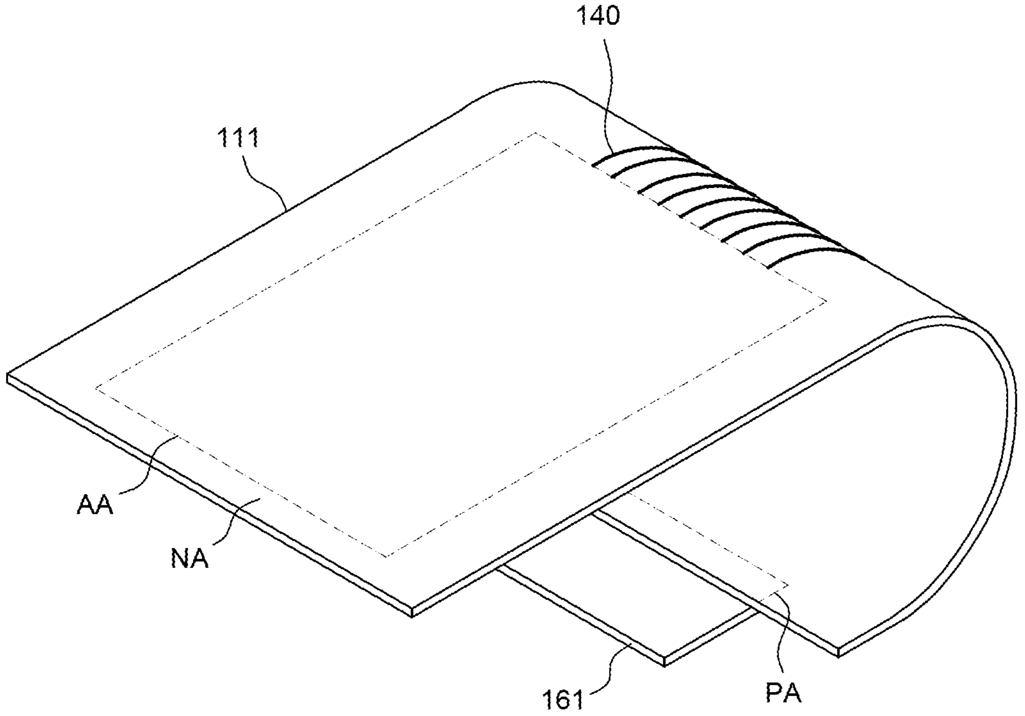
FIG. 5 is a perspective view illustrating a bent state of the display device according to the embodiments of the present specification.

FIG. 5 is a perspective view illustrating a bent state of the display device according to the embodiments of the present specification.

FIGS. 4 and 5 illustrate a case in which one side, e.g., a lower side of the display device is bent.

With reference to FIG. 4, the display device of the embodiments of the present specification may include the substrate 111 and a circuit element 161.

The substrate 111 may be divided into the display area AA, and the non-display area NA that is a bezel area that surrounds the edge of the display area AA.

The non-display area NA may further include the pad area PA positioned outside the bending area BA.

A plurality of subpixels may be disposed in the display area AA. The subpixels may be arranged in the display area AA in an R (red), G (green), B (blue) manner or an R, G, B, W (white) manner, thereby implementing a full color. The subpixels may be separated by the gate line and the data line that intersect each other.

The circuit element 161 may include bumps (or terminals). The bump of the circuit element 161 may adjoin pads in the pad area PA through an anisotropic conductive film.

The circuit element 161 may be a chip-on film (COF) made by mounting a drive integrated circuit (IC) on a flexible film. In addition, the circuit element 161 may be configured as a COG type joined directly to the pads on the substrate 111 by a chip-on glass (COG) process. In addition, the circuit element 161 may be a flexible circuit such as a flexible flat cable (FFC) or a flexible printed circuit (FPC). However, in the following embodiment, the description will be focused on the COF as an example of the circuit element 161. However, the present specification is not limited thereto.

The driving signals, e.g., the gate signal and the data signal received through the circuit element 161 may be supplied to the gate lines and the data lines in the display area AA through the plurality of signal lines 140 such as a routing line.

In the display device, in addition to the display area AA in which an input image is implemented, a sufficient space, in which the pad area PA, the circuit element 161, not limited to may be positioned, needs to be ensured. The space corresponds to a bezel area. The bezel area is recognized by a user positioned forward of a front surface of the display device, which may somewhat cause deterioration in aesthetic appearance.

With reference to FIG. 5, in the case of the display device according to the embodiments of the present specification, a lower edge of the substrate 111 may be bent in a direction of a rear surface so as to have a predetermined curvature.

The lower edge of the substrate 111 may correspond to an outer side of the display area AA and correspond to an area in which the pad area PA is positioned. When the substrate 111 is bent, the pad area PA may be positioned to overlap the display area AA in the direction of the rear surface of the display area AA. Therefore, it is possible to minimize the bezel area recognized from a location disposed forward of the display device. Therefore, a bezel width may be reduced, and the aesthetic appearance may be improved.

To this end, the substrate 111 may be made of a flexible material that may be bent. For example, the substrate 111 may be made of a plastic material such as polyimide (PI). In addition, the plurality of signal lines 140 may each be made of a material having flexibility. For example, the plurality of signal lines 140 may each be made of a material such as a metal nanowire, a metal mesh, or a carbon nanotube (CNT). However, the present disclosure is not limited thereto.

Meanwhile, the plurality of signal lines 140 according to the embodiments of the present specification may be disposed as a multilayer structure (or dual wiring structure) in the non-display area NA including the bending area BA. Therefore, a margin for disposing the lines may be provided, which may facilitate the line/electrode arrangement design.

In addition, the plurality of signal lines 140 according to the embodiments of the present specification may be disposed so that a relatively high voltage signal line may be disposed on an upper layer, and a relatively low voltage signal line may be disposed on a lower layer. Therefore, an electric corrosion defect of the plurality of signal lines 140 in the bending area BA may be suppressed, which may improve the reliability of the display device. However, the present specification is not limited thereto.

Figure 6:
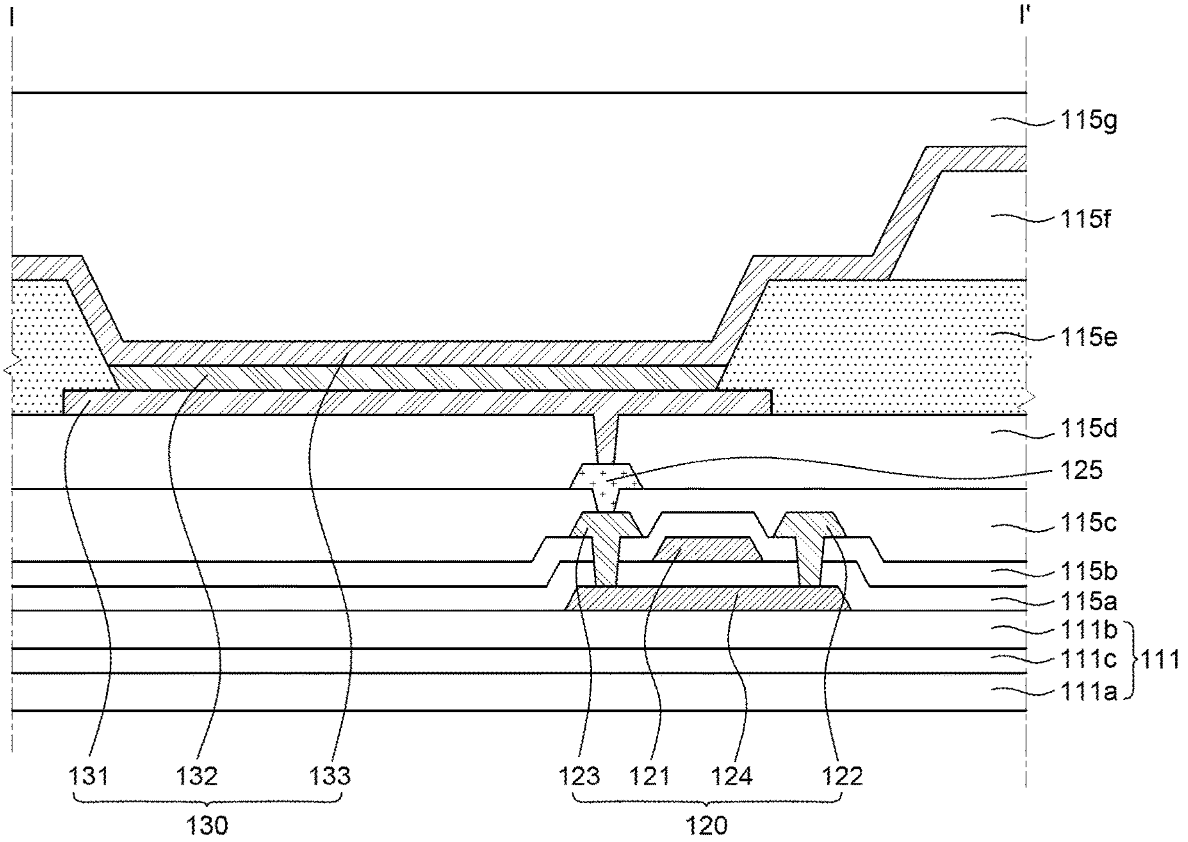
FIG. 6 is a cross-sectional view taken along line I-I' in FIG. 3.

FIG. 6 is a cross-sectional view taken along line I-I' in FIG. 3.

FIG. 6 illustrates, in detail, a cross-sectional structure of the display area AA described with reference to FIG. 3.

With reference to FIG. 6, the substrate 111 serves to support and protect the components of the display device that are disposed on an upper portion of the substrate 110.

Recently, the flexible substrate 111 has been made of a flexible material such as plastic having flexibility.

The substrate 111 may be provided in the form of a film made of one selected from a group consisting of polyester-based polymer, silicon-based polymer, acrylic polymer, polyolefin-based polymer, and a copolymer thereof.

The substrate 111 may include a first substrate 111*a*, a second substrate 111*b*, and an insulation film 111*c*. The insulation film 111*c* may be disposed between the first substrate 111*a* and the second substrate 111*b*. As described above, the substrate 111 is configured by the first substrate 111*a*, the second substrate 111*b*, and the insulation film 111*c*, which may suppress moisture penetration. For example, the first substrate 111*a* and the second substrate 111*b* may each be a substrate made of polyimide (PI).

A buffer layer may be further disposed on the substrate 111. The buffer layer may suppress the penetration of outside moisture or other impurities into the substrate 111 and planarize a surface of the substrate 111. The buffer layer is not a necessarily essential component and may be excluded depending on the type of thin-film transistor 120 disposed on the substrate 111.

The thin-film transistor 120 may be disposed on the upper portion of the substrate 111.

For example, the thin-film transistor 120 may include a gate electrode 121, a source electrode 122, a drain electrode 123, and a semiconductor layer 124.

For example, the semiconductor layer 124 may be made of amorphous silicon or polycrystalline silicon. However, the present disclosure is not limited thereto. For example, the polycrystalline silicon has better mobility and reliability and requires lower energy power consumption than the amorphous silicon. Therefore, the polycrystalline silicon may be applied to the driving thin-film transistor in the pixel.

In addition, the semiconductor layer 124 may be made of an oxide semiconductor. The oxide semiconductor is excellent in mobility and uniformity properties. For example, the oxide semiconductor may be made of materials based on indium-tin-gallium-zinc oxide (InSnGaZnO) which is quaternary metal oxide, materials based on indium-gallium-zinc oxide (InGaZnO), indium-tin-zinc oxide (InSnZnO), tin-gallium-zinc oxide (SnGaZnO), aluminum-gallium-zinc oxide (AlGaZnO), indium-aluminum-zinc oxide (InAlZnO), and tin-aluminum-zinc oxide (SnAlZnO) which are ternary metal oxide, materials based on indium-zinc oxide (InZnO), tin-zinc oxide (SnZnO), aluminum-zinc oxide (AlZnO), zinc-magnesium oxide (ZnMgO), tin-magnesium oxide (SnMgO), indium-magnesium oxide (InMgO), and indium-gallium oxide (InGaO) which are binary metal oxide, and materials based on indium oxide (InO), tin oxide (SnO), and zinc oxide (ZnO). The present disclosure is not limited to a composition ratio of the respective elements.

In comparison with an existing low-temperature polycrystalline silicon (LTPS) thin-film transistor, the oxide thin-film transistor 120 having the semiconductor layer 124 made of an oxide semiconductor may perform a GIP operation at 1 to 10 Hz on the basis of excellent off-current properties, thereby implementing a low-electric power operation.

The semiconductor layer 124 may include source and drain areas including p-type or n-type impurities and a channel area between the source area and the drain area. The semiconductor layer 124 may further include a low-concentration doping area between the source and drain areas adjacent to the channel area.

The source and drain areas are areas in which impurities are doped at high concentration. The source electrode 122 and the drain electrode 123 of the thin-film transistor 120 may be respectively connected to the source and drain areas.

The p-type impurities or n-type impurities may be used as impurities ions. The p-type impurity may be one of boron (B), aluminum (Al), gallium (Ga), and indium (In). The n-type impurity may be one of phosphorus (P), arsenic (As), and antimony (Sb).

In addition, according to a structure of an NMOS or PMOS thin-film transistor, the channel area of the semiconductor layer 124 may be doped with n-type impurities or p-type impurities. The NMOS or PMOS thin-film transistor may be applied as the thin-film transistor included in the display device according to the embodiment of the present specification.

A first insulation layer 115*a* may be disposed on the semiconductor layer 124.

The first insulation layer 115*a* may be configured as a single layer or multilayer made of silicon oxide (SiOx) and silicon nitride (SiNx). The first insulation layer 115*a* may be disposed so that the electric current flowing through the semiconductor layer 124 does not flow to the gate electrode 121. The silicon oxide has lower flexibility than metal but has higher flexibility than silicon nitride. A single layer or multilayer may be made of silicon oxide may be implemented in accordance with the properties of the silicon oxide.

The gate electrode 121 may be disposed on the first insulation layer 115*a*.

The gate electrode 121 may serve as a switch configured to turn on or off the thin-film transistor 120 based on an electrical signal transmitted from the outside through the gate line. The gate electrode 121 may be configured as a single layer or multilayer made of a conductive metallic material such as copper (Cu), aluminum (Al), molybdenum (Mo), chromium (Cr), gold (Au), titanium (Ti), nickel (Ni), neodymium (Nd), or an alloy thereof. However, the present disclosure is not limited thereto.

A second insulation layer 115*b* may be disposed on the gate electrode 121.

For example, the second insulation layer 115*b* may be configured as a single layer or multilayer made of silicon oxide (SiOx) or silicon nitride (SiNx) in order to insulate the gate electrode 121, the source electrode 122, and the drain electrode 123.

The source electrode 122 and the drain electrode 123 may be disposed on the second insulation layer 115*b*. For convenience of description, the source electrode 122 and the drain electrode 123 may be referred to as a first conductive layer. Hereinafter, in the present specification, the first conductive layer may mean the source electrode 122 and the drain electrode 123.

The source electrode 122 and the drain electrode 123 may be connected to the data line and allow the electrical signal transmitted from the outside to be transmitted from the thin-film transistor 120 to the light-emitting element 130. For example, the source electrode 122 and the drain electrode 123 may each be configured as a single layer or multilayer made of copper (Cu), aluminum (Al), molybdenum (Mo), chromium (Cr), gold (Au), titanium (Ti), nickel (Ni), neodymium (Nd), or an alloy thereof. However, the present specification is not limited thereto.

A protective layer including an inorganic material such as silicon oxide (SiOx) or silicon nitride (SiNx) may be further disposed on the thin-film transistor 120 configured as described above.

The protective layer may serve to suppress unnecessary electrical connection between the components disposed above and below the protective layer. The protective layer may also serve to inhibit damage or contamination from the outside. The protective layer may be excluded in accordance with the configurations and properties of the thin-film transistor 120 and the light-emitting element 130.

The structures of the thin-film transistor 120 may be classified into an inverted staggered structure and a coplanar structure depending on the positions of the constituent elements that constitute the thin-film transistor 120. For example, in the case of the thin-film transistor having the inverted staggered structure, the gate electrode may be positioned at a side opposite to the source electrode and the drain electrode based on the semiconductor layer. In contrast, as illustrated in FIG. 6, in the case of the thin-film transistor 120 having the coplanar structure, the gate electrode 121 may be positioned at the same side as the source electrode 122 and the drain electrode 123 based on the semiconductor layer 124.

FIG. 6 illustrates the thin-film transistor 120 having the coplanar structure. However, the display device of the embodiments of the present specification may include the thin-film transistor having the inverted staggered structure.

In addition, for convenience of description, only the driving thin-film transistor 120 is illustrated among various thin-film transistors that may be included in the display device. However, a switching thin-film transistor, a capacitor, and the like may also be included in the display device.

For example, when a signal is applied from the gate line, the switching thin-film transistor may transmit the signal from the data line to the gate electrode 121 of the driving thin-film transistor 120. Further, in response to a signal received from the switching thin-film transistor, the driving thin-film transistor 120 may transmit the electric current, which is transmitted through the power line, to an anode 131. The driving thin-film transistor 120 may control light emission on the basis of the electric current transmitted to the anode 131.

Planarization layers 115*c* and 115*d* may be disposed on an upper portion of the thin-film transistor 120. The planarization layers 115*c* and 115*d* may be disposed to protect the thin-film transistor 120, reduce a level difference caused by the thin-film transistor 120, and reduce parasitic capacitance occurring between the thin-film transistor 120, the gate line, the data line, and the light-emitting elements 130.

For example, the planarization layers 115*c* and 115*d* may each be made of one or more materials among acrylic resin, epoxy resin, phenolic resin, polyamide-based resin, polyimide-based resin, unsaturated polyester-based resin, polyphenylene-based resin, polyphenylene sulfide-based resin, and benzocyclobutene. However, the present disclosure is not limited thereto.

As illustrated in FIG. 6, the planarization layers 115*c* and 115*d* may have a multilayer structure including at least two layers and include a first planarization layer 115*c* and a second planarization layer 115*d*. The first planarization layer 115*c* may be disposed to expose the thin-film transistor 120. For example, the source electrode 122 and the drain electrode 123 of the thin-film transistor 120 may be partially exposed.

The planarization layers 115*c* and 115*d* may each be an overcoat layer. However, the present disclosure is not limited thereto.

In this case, a second conductive layer 125 may be disposed on the first planarization layer 115*c* to electrically connect the thin-film transistor 120 and the light-emitting element 130. In addition, although not illustrated in FIG. 6, various metal layers may be disposed on the first planarization layer 115*c* and serve as electrodes and lines such as the data lines or the signal lines.

The second planarization layer 115*d* may be disposed on an upper portion of the first planarization layer 115*c* and an upper portion of the second conductive layer 125.

That is, in the display device of the embodiments of the present specification, the configuration in which the planarization layers 115*c* and 115*d* are provided as two layers is based on the fact that the number of various types of signal lines increases as the display panel has high resolution. Therefore, the additional layer is provided because it is difficult to dispose all the lines on a single layer while ensuring minimum intervals. The addition of the additional layer, i.e., the second planarization layer 115*d* may provide a margin for disposing lines, which facilitates the disposition design of lines/electrodes. In addition, in case that a dielectric material is used for the planarization layers 115*c* and 115*d* having a multilayer structure, the planarization layers 115*c* and 115*d* may serve to create capacitance between the metal layers.

The second planarization layer 115*d* may be formed so that a part of the second conductive layer 125 is exposed. The drain electrode 123 of the thin-film transistor 120 and the anode 131 of the light-emitting element 130 may be electrically connected by the second conductive layer 125.

The light-emitting element 130 may be disposed on an upper portion of the second planarization layer 115*d*.

The light-emitting element 130 may include the anode 131, a light-emitting part 132, and a cathode 133.

The anode 131 may be disposed on the second planarization layer 115*d*.

The anode 131 is an electrode that serves to supply positive holes to the light-emitting part 132. The anode 131 may be connected to the second conductive layer 125 through a contact hole formed in the second planarization layer 115*d*, such that the anode 131 may be electrically connected to the thin-film transistor 120.

The anode 131 may be made of a transparent, electrically conductive material such as indium tin oxide (ITO) and indium zinc oxide (IZO). However, the present disclosure is not limited thereto.

In case that the display device is a top emission type display device that emits light toward an upper side at which the cathode 133 is disposed, the display device may further include a reflective layer so that the emitted light may be reflected by the anode 131 and more smoothly discharged to the upper side at which the cathode 133 is disposed. For example, the anode 131 may have a two-layer structure in which a reflective layer and a transparent conductive layer made of a transparent electrically conductive material are sequentially stacked. Alternatively, the anode 131 may have a three-layer structure in which the transparent conductive layer, the reflective layer, and the transparent conductive layer are sequentially stacked. The reflective layer may be made of an alloy containing silver (Ag). However, the present disclosure is not limited to the top emission type, and the present disclosure may also be applied to a bottom emission type.

A bank 115*e* may be disposed on an upper portion of the anode 131 and an upper portion of the second planarization layer 115*d*.

The bank 115*e* may define the subpixel by dividing the area in which light is actually emitted. For example, the bank 115*e* may be formed by performing photolithography after forming a photoresist on the anode 131.

The photoresist refers to photosensitive resin having solubility that is changed in respect to a developer by the action of light. A particular pattern may be obtained by exposing and developing the photoresist. The photoresists may be classified into a positive photoresist and a negative photoresist. The positive photoresist refers to a photoresist in which solubility of an exposed part in respect to a developer is increased by exposure. When the positive photoresist is developed, a pattern from which the exposed part is removed may be obtained. The negative photoresist refers to a photoresist in which solubility of an exposed part in respect to a developer is decreased by exposure. When the negative photoresist is developed, a pattern from which a non-exposed part is removed may be obtained.

A fine metal mask (FMM), which is a deposition mask, may be used to form the light-emitting part 132 of the light-emitting element 130.

For example, a spacer 115*f* may be disposed on an upper portion of the bank 115*e* and made of one of polyimide, photo acrylic, and benzocyclobutene (BCB). The spacer 115*f* is used to inhibit damage caused by contact with the deposition mask disposed on the bank 115*e*. The spacer 115*f* serves to maintain a predetermined distance between the bank 115*e* and the deposition mask.

The light-emitting part 132 may be disposed between the anode 131 and the cathode 133.

The light-emitting part 132 serves to emit light. The light-emitting part 132 may include at least one of a hole injection layer (HIL), a hole transport layer (HTL), a light-emitting layer, an electron transport layer (ETL), and an electron injection layer (EIL). Some components may be excluded depending on the structure or properties of the display device. In this case, an electroluminescent layer and an inorganic light-emitting layer may be applied as the light-emitting layer.

The hole injection layer is disposed on the anode 131 and serves to facilitate the injection of the positive holes.

The hole transport layer is disposed on the hole injection layer and serves to smoothly transmit the positive holes to the light-emitting layer.

The light-emitting layer is disposed on the hole transport layer. The light-emitting layer may be made of a material capable of emitting light with a particular color, thereby emitting the light with the particular color. Further, a phosphorescent material or a fluorescent material may be used as the light-emitting material.

The electron injection layer may further be disposed on the electron transport layer. The electron injection layer is an organic layer that facilitates the injection of electrons from the cathode 133. The electron injection layer may be excluded depending on the structure and properties of the display device.

Meanwhile, an electron blocking layer for blocking a flow of electrons or a hole blocking layer for blocking a flow of positive holes may be further disposed at a position adjacent to the light-emitting layer. Therefore, it is possible to inhibit the electron from moving from the light-emitting layer and passing through the adjacent hole transport layer when the electrons are injected into the light-emitting layer or inhibit the positive hole from moving from the light-emitting layer and passing through the adjacent electron transport layer when the positive holes are injected into the light-emitting layer, thereby improving luminous efficiency.

The cathode 133 is disposed on the light-emitting part 132 and serves to supply the electrons to the light-emitting part 132. The cathode 133 needs to supply electrons. Therefore, the cathode 133 may be made of a metallic material such as magnesium (Mg), a silver-magnesium alloy, or the like that is an electrically conductive material having a low work function. However, the present disclosure is not limited thereto.

In the case of the top-emission type display device, the cathode 133 may be made of transparent conductive oxide such as indium tin oxide (ITO), indium zinc oxide (IZO), indium-tin-zinc oxide (ITZO), zinc oxide (ZnO), and tin oxide (TO). However, as described above, the display device of the present specification is not limited to the top emission type.

A sealing part 115*g* may be disposed on the upper portion of the light-emitting element 130 to inhibit the thin-film transistor 120 and the light-emitting element 130, which are the constituent elements of the display device, from being oxidized or damaged by moisture, oxygen, or impurities introduced from the outside. For example, the sealing part 115*g* may be formed by stacking a plurality of sealing layers, a particle compensation layer, and a plurality of barrier films.

The sealing layer may be disposed on the entire upper portions of the thin-film transistor 120 and the light-emitting element 130 and made of one of silicon nitride (SiNx) or aluminum oxide (AlyOz) that is an inorganic material. However, the present disclosure is not limited thereto. A sealing layer may be further disposed on the particle compensation layer disposed on the sealing layer.

The particle compensation layer may be disposed on the sealing layer and made of resin based on silicon oxycarbon (SiOCz), acrylic, or epoxy that is an organic material. However, the present disclosure is not limited thereto. When a defect occurs because of cracks caused by foreign substances or particles that may be produced during a process, the particle compensation layer may compensate for and cover unevenness and foreign substances.

The barrier film may be disposed on the sealing layer and the particle compensation layer and delay the penetration of oxygen and moisture into the display device from the outside. The barrier film may be provided in the form of a film having light transmissivity and double-sided bondability and made of any one insulating material among an olefin-based insulating material, an acrylic-based insulating material, and a silicon-based insulating material. Alternatively, a barrier film made of any one material among cycloolefin polymer (COP), cycloolefin copolymer (COC), and polycarbonate (PC) may be further stacked. However, the present disclosure is not limited thereto.

Although not illustrated, for example, a polarizing film may be disposed on an upper portion of the sealing part 115*g*.

In addition, a touch panel may be disposed on an upper portion of the polarizing film. However, the present disclosure is not limited thereto. The polarizing film may be disposed on an upper portion of the touch panel.

The touch panel uses an input method that allows the user to enter information directly on a screen by pushing a display screen by using the user's hand or a pen. For example, the touch panel allows the user to directly perform a desired task while looking at the screen, and anyone may easily manipulate the touch panel. Therefore, the touch panel is considered as the most ideal input method under a graphical user interface (GUI) environment. Therefore, the touch panels are widely and currently used in various fields such as mobile phones, PDAs, banks, and government offices, various types of medical instruments, tourism, and information in main institutions.

Figure 7:
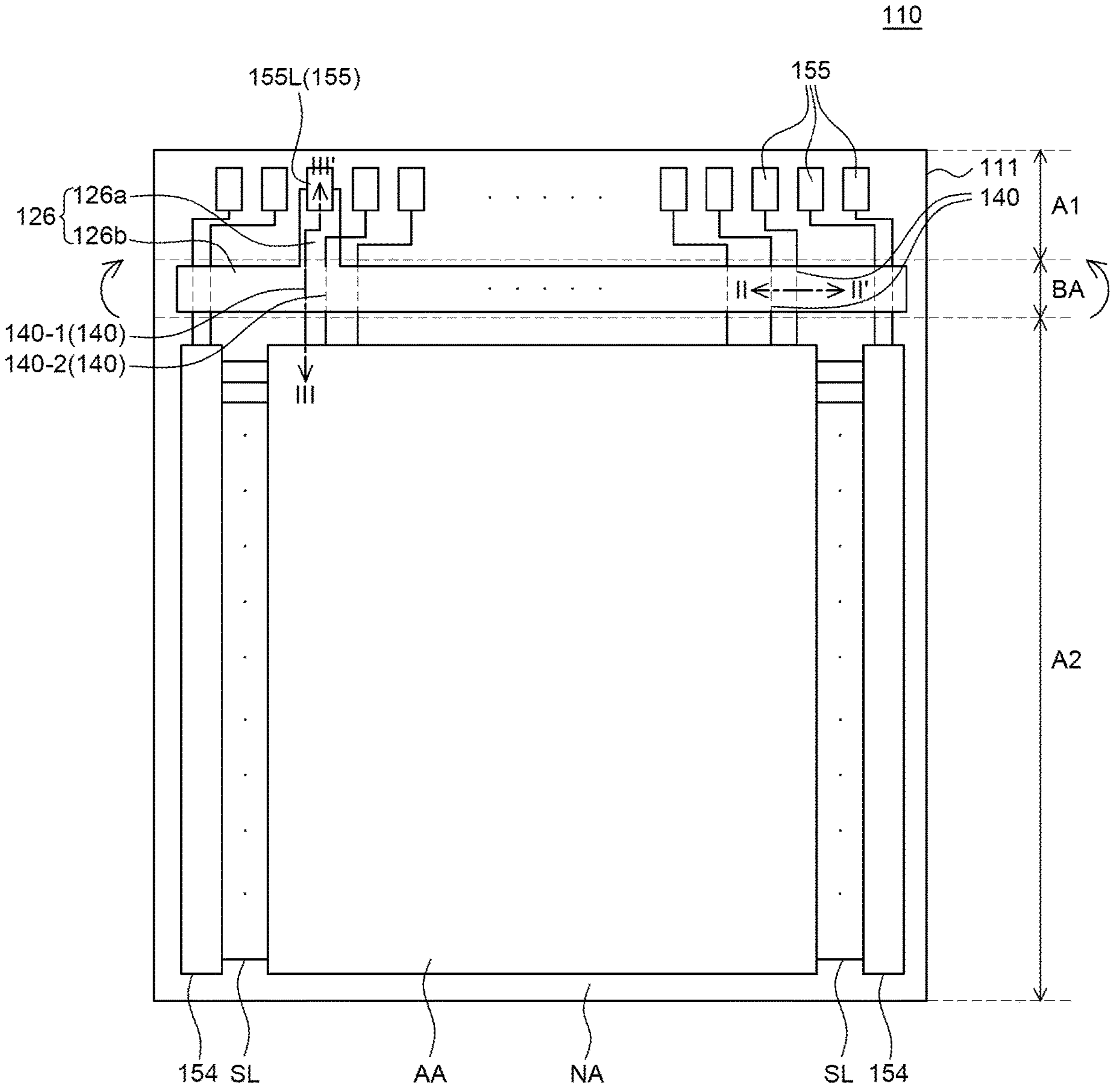
FIG. 7 is a top plan view of a display device according to a first embodiment of the present specification.

FIG. 7 is a top plan view of a display device according to a first embodiment of the present specification.

For reference, the description of the configurations identical to or duplicative of those described above with reference to FIG. 7 may be omitted.

With reference to FIG. 7, the display device according to the first embodiment of the present specification may include the substrate 111, the plurality of pads 155, the circuit element 161, the plurality of signal lines 140, the second planarization layer 115*d*, and a shield layer 126.

The plurality of pads 155 may be disposed on the upper portion of the substrate 111 in the first area A1. For example, the plurality of pads 155 may be disposed on the upper portion of the substrate 111 in the pad area PA included in the first area A1. The plurality of pads 155 may include a first pad 155L. The first pad 155L may receive electric power from the circuit element 161 and be electrically connected to the circuit element 161. The first pad 155L may be connected to the high-potential power line VDD or the low-potential power line GND of the circuit element 161. For example, the first pad 155L may receive ELVDD or ELVSS power or be connected to a ground power source.

The plurality of signal lines 140 may be disposed on the upper portion of the substrate 111 in the bending area BA. The plurality of signal lines 140 may be electrically connected to the plurality of pads 155, respectively. The plurality of pads 155 may receive predetermined types of signals from the circuit element 161. The plurality of signal lines 140 may each transmit a predetermined signal to the pixel disposed in the display area AA through the pads 155 connected to the plurality of signal lines 140.

The second planarization layer 115*d* may be disposed on upper portions of the plurality of signal lines 140 and cover the plurality of signal lines 140. As a result, the second planarization layer 115*d* may implement a flat top surface. For convenience of description, the second planarization layer 115*d* is described as covering the plurality of signal lines 140. Specific examples will be described below in detail with reference to FIG. 8.

The shield layer 126 may be disposed on the upper portion of the second planarization layer 115*d* in the bending area BA. For example, the shield layer 126 may be disposed on the second planarization layer 115*d*. For example, the shield layer 126 may at least cover a first signal line 140-1 among the plurality of signal lines 140.

For example, the shield layer 126 may cover all the plurality of signal lines 140 in the bending area BA. However, the present disclosure is not limited thereto.

The shield layer 126 may include an electrically conductive material or a metallic material.

For example, the shield layer 126 may be made of an electrically conductive material such as gold (Au), silver (Ag), or aluminum (Al) that has excellent flexibility. The shield layer 126 may be made of one of various electrically conductive materials used for the display area AA. In addition, for example, the shield layer 126 may be made of an alloy of molybdenum (Mo), chromium (Cr), titanium (Ti), nickel (Ni), neodymium (Nd), copper (Cu), silver (Ag), and magnesium (Mg).

The shield layer 126 may be configured as a multilayer structure including various electrically conductive materials. For example, the shield layer 126 may be configured as a three-layer structure including titanium (Ti), aluminum (Al), and titanium (Ti). However, the present disclosure is not limited thereto.

In this case, in a cross-sectional view, the shield layer 126 may block an electric field directed toward a lower side of the shield layer 126 from an upper side of the shield layer 126. To this end, a voltage with a predetermined magnitude may be applied to the shield layer 126.

Therefore, the shield layer 126 may inhibit the electric field from affecting the signal line 140 or minimize a degree to which the electric field affects the signal line 140. To this end, the shield layer 126 may be formed to cover the signal line 140. For example, the shield layer 126 may cover at least some of the plurality of signal lines 140. For example, when viewed in a direction perpendicular to the substrate 111, the shield layer 126 may overlap at least some of the plurality of signal lines 140 in the bending area BA.

The shield layer 126 may be electrically connected to the first pad 155L. When viewed in the direction perpendicular to the substrate 111, a part of the shield layer 126 may overlap the first pad 155L. The shield layer 126 may be electrically connected to the first pad 155L or electrically connected to the first pad 155L and a pad positioned at the periphery of the first pad 155L.

For example, the shield layer 126 may include a connection part 126*a* disposed on the upper portion of the substrate 111 in the first area A1 and electrically connected to the first pad 155L. When viewed in the direction perpendicular to the substrate 111, a portion, which overlaps the first pad 155L, may constitute the connection part 126*a*.

For example, the shield layer 126 may include a shield part 126*b* disposed on the upper portion of the substrate 111 in the bending area BA, extending from the connection part 126*a* to the bending area BA, and configured to at least cover the first signal line 140-1. When viewed in the direction perpendicular to the substrate 111, a portion, which overlaps the bending area BA, may constitute the shield part 126*b*. For example, the connection part 126*a* may mean a portion extending from the shield part 126*b* toward the first pad 155L. For example, a portion of the shield layer 126, which is positioned in the bending area BA, may be the shield part 126*b*, and a portion of the shield layer 126, which is positioned in the first area A1, may be the connection part 126*a*.

Although not illustrated in FIG. 7, the shield layer 126 may be connected to an electric current detection part. The electric current detection part may be connected to the circuit element 161 or configured as a separate component. The electric current detection part may detect a change in value of an electric current flowing in the shield layer 126.

For example, the electric current detection part may detect whether the amount of change in value of the electric current flowing in the shield layer 126 is larger than a preset amount. A case in which the amount of change in value of the electric current larger than the preset amount is measured may be a case in which a problem such as the occurrence of cracks in the shield layer 126 occurs. If the value of the electric current flowing in the shield layer 126 is too small, the efficiency in blocking the electric field by the shield layer 126 may deteriorate. Therefore, the amount of change in value of the electric current flowing in the shield layer 126 needs to be detected.

Figure 8:
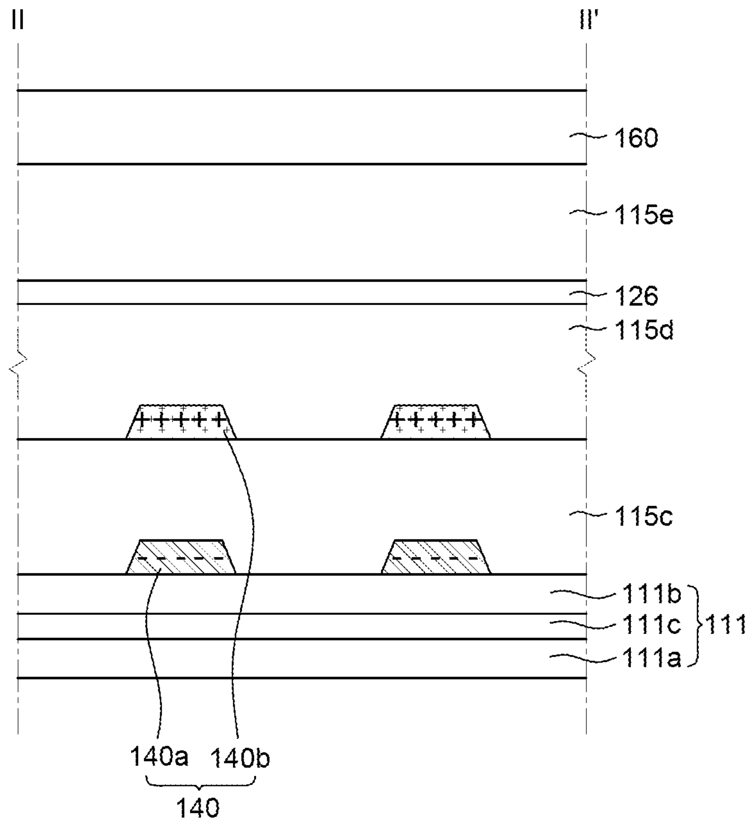
FIG. 8 is a cross-sectional view taken along line II-II' in FIG. 7.

FIG. 8 is a cross-sectional view taken along line II-II' in FIG. 7.

For reference, the description of the configurations identical to or duplicative of those described above with reference to FIG. 8 may be omitted.

With reference to FIG. 8, among the plurality of signal lines 140, a line, which is positioned on the same layer as the first conductive layer and includes the same material as the first conductive layer, may be a lower line 140*a*. In addition, among the plurality of signal lines 140, a line, which is positioned on the same layer as the second conductive layer 125 and includes the same material as the second conductive layer 125, may be an upper line 140*b*. The upper line 140*b* may include an nth signal line such as the first signal line 140-1 or a second signal line 140-2.

For example, the lower line 140*a* may be disposed on a lower portion of the upper line 140*b* and insulated from the upper line 140*b*. However, when viewed in the direction perpendicular to the substrate 111, at least the first signal line 140-1 of the upper line 140*b* may overlap the lower line 140*a*.

For example, the upper line 140*b* may transmit a positive signal (voltage), and the lower line 140*a* may transmit a negative signal (voltage). On the contrary, the upper line

140*b* may transmit a negative signal (voltage), and the lower line 140*a* may transmit a positive signal (voltage).

As described above, the planarization layers 115*c* and 115*d* may have the multilayer structure including at least two layers and include the first planarization layer 115*c* and the second planarization layer 115*d.*

For example, the first planarization layer 115*c* may be disposed on an upper portion of the lower line 140*a* and cover the lower line 140*a*. In addition, the second planarization layer 115*d* may be disposed on an upper portion of the upper line 140*b* and cover the upper line 140*b*. For example, the first planarization layer 115*c* may be disposed on an upper portion of the first signal line 140-1 and cover the first signal line 140-1. In addition, the second planarization layer 115*d* may be disposed on an upper portion of the second signal line 140-2 and cover the second signal line 140-2.

With reference to FIG. 8, the display device may further include the bank 115*e* disposed on an upper portion of the shield layer 126, and an upper layer 160 disposed on an upper portion of the bank 115*e* in the bending area BA and including ions therein.

The ion may have positive or negative polarity. The ion, which has a polarity as described above, may be a mobile ion that moves in the upper layer 160. In case that a voltage is applied to the upper layer 160, an electric field may be generated by the ions, and the electric field may affect the plurality of signal lines 140 positioned on a lower portion of the upper layer 160. To suppress this situation, the shield layer 126 may be disposed between the plurality of signal lines 140 and the upper layer 160.

For example, the upper layer 160 may be a micro-coating layer applied onto the upper portions of the plurality of signal lines 140 in the bending area BA and made of photocurable resin.

For example, because inorganic insulation layers in the bending area BA of the display device may be etched, line traces in the bending area BA may be vulnerable to moisture and other foreign substances. In particular, various pads and conductive lines may be chamfered to test the components during the process of manufacturing the display device 100. For example, the conductive lines extending from a notched edge of the display device 100 may remain. The conductive lines may be easily corroded by moisture, which may cause corrosion of other peripheral conductive lines.

Therefore, to provide additional protection against moisture and other foreign substances, a protective layer of the "micro-coating layer" may be provided, as the upper layer 160, on upper portions of the line traces in the bending area BA of the display device.

The micro-coating layer may have excellent moisture resistance and provide sufficient flexibility so that the micro-coating layer may be used in the bending area BA of the display device. In addition, a material of the micro-coating layer may be a material that may be cured by low energy within a limited time so that the components disposed below the micro-coating layer are not damaged while the curing is performed.

For example, the micro-coating layer may be made of photocurable resin cured by light (e.g., UV rays, visible light, an UV LED, or the like) and applied onto preset areas of the display device.

Figure 9:
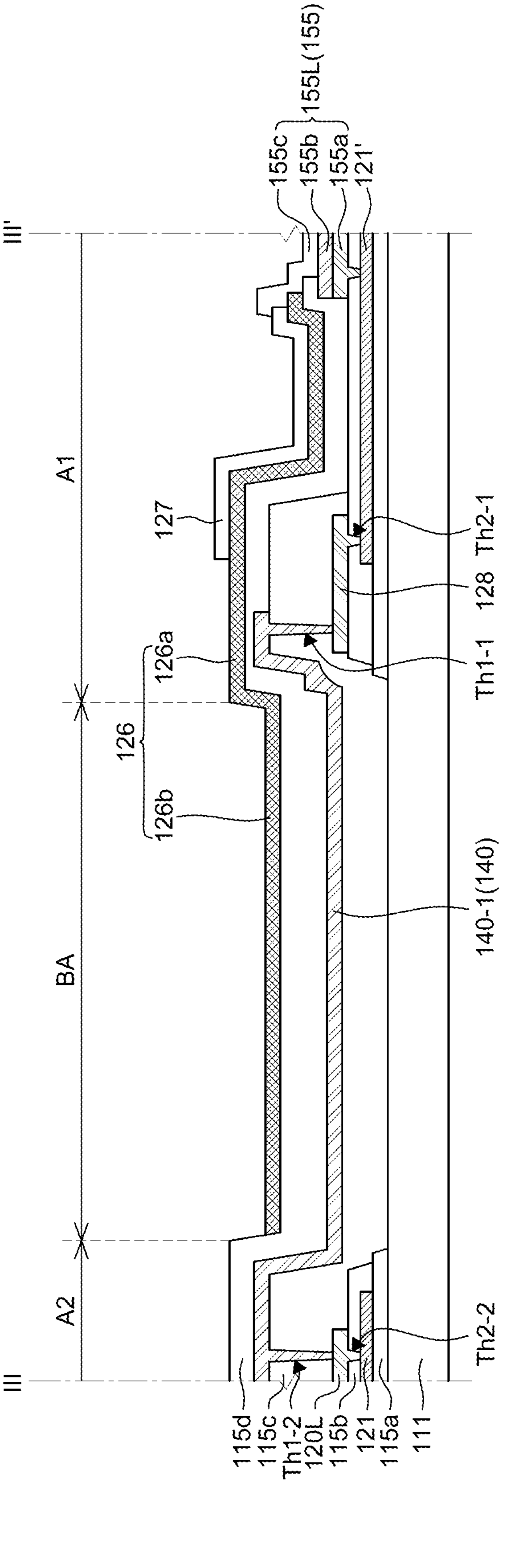
FIG. 9 is a cross-sectional view taken along line III-III' in FIG. 7.

FIG. 9 is a cross-sectional view taken along line III-III' in FIG. 7.

For reference, the description of the configurations identical to or duplicative of those described above with reference to FIG. 9 may be omitted.

With reference to FIGS. 6 and 9, the display device may include a first conductive layer 120L disposed on the upper portion of the substrate 111 in the display area, an organic insulation layer disposed on an upper portion of the first conductive layer 120L, and the second conductive layer 125 disposed between the organic insulation layer and the planarization layers 115*c* and 115*d*. In this case, the organic insulation layer may be the above-mentioned first planarization layer 115*c*. For convenience of description, in the present specification, the organic insulation layer and the first planarization layer 115*c* may be used interchangeably.

In addition, the display device may further include the gate electrode 121 disposed between the substrate 111 and the first conductive layer 120L, and an inorganic insulation layer disposed between the gate electrode 121 and the first conductive layer 120L. In this case, the inorganic insulation layer may be the above-mentioned second insulation layer 115*b*. For convenience of description, in the present specification, the inorganic insulation layer and the second insulation layer 115*b* may be used interchangeably.

In addition, the display device may further include a first sub-line 128 disposed on the upper portion of the substrate 111 in the first area A1 and configured to electrically connect the first signal line 140-1 and the first pad 155L. The first sub-line 128 may be made of the same material as the first conductive layer 120L and disposed on the same layer as the first conductive layer 120L.

For example, the first planarization layer 115*c* may include a first through-hole Th1-1 positioned in the first area A1. The first signal line 140-1 and the first sub-line 128 may be connected through the first through-hole Th1-1. For example, the first planarization layer 115*c* may include a second through-hole Th1-2 positioned in the second area A2. The first signal line 140-1 and the first conductive layer 120L may be connected through the second through-hole Th1-2.

For example, the second insulation layer 115*b* may include a third through-hole Th2-1 positioned in the first area A1. The first sub-line 128 and a second sub-line 121' may be connected through the third through-hole Th2-1. For example, the second insulation layer 115*b* may include a fourth through-hole Th2-2 positioned in the second area A2. The first conductive layer 120L and the gate electrode 121 may be connected through the fourth through-hole Th2-2.

The first pad 155L may be configured by a plurality of layers.

For example, the first pad 155L may include a first-first sub-pad 155*a* disposed on the same layer as the first conductive layer 120L and including the same material as the first conductive layer 120L, and a first-second sub-pad 155*b* disposed on the same layer as the second conductive layer 125, including the same material as the second conductive layer 125, and disposed on the first-first sub-pad 155*a*. For example, the first pad 155L may further include a first-third sub-pad 155*c* disposed on the first-second sub-pad 155*b*. The first-third sub-pad 155*c* may include a conductive material or a metallic material. For example, the first-third sub-pad 155*c* may include the same material as the shield layer 126 in some instances. The first-third sub-pad 155*c* may be in direct contact with the above-mentioned circuit element 161.

For example, the display device may further include a touch buffer layer 127 disposed on the connection part 126*a* of the shield layer 126 in the first area A1. The touch buffer layer 127 may inhibit outside moisture, foreign substances, or a liquid chemical such as a developer or an etching liquid, which is used during a process of manufacturing the touch electrodes formed on the upper portion of the touch buffer layer 127, from penetrating into the light-emitting element.

Figure 10:
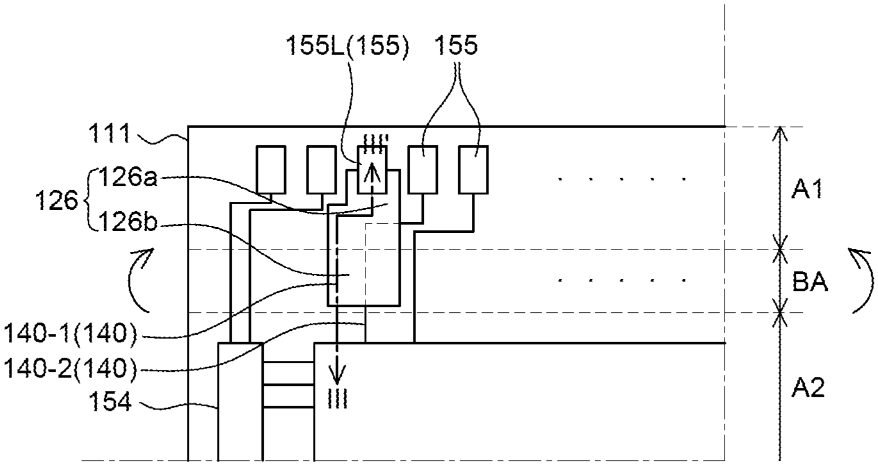
FIG. 10 is a top plan view of a part of a display device according to a second embodiment of the present specification.

FIG. 10 is a top plan view of a part of a display device according to a second embodiment of the present specification.

FIG. 10 schematically illustrates a part of the display device of the second embodiment of the present specification while focusing on the shield layer 126.

For reference, the description of the configurations identical to or duplicative of those described above with reference to FIG. 10 may be omitted.

For example, with reference to FIG. 10, the shield layer 126 may cover the first signal line 140-1 and the second signal line 140-2. The shield part **126*b* included in the shield layer 126 may cover the first signal line 140-1 and the second signal line 140-2 in the bending area BA. For example, the first signal line 140-1 and the second signal line 140-2 may be two lines disposed adjacent to each other when viewed in the direction perpendicular to the substrate 111. The first signal line 140-1 may be electrically connected to the first pad 155L, and the second signal line 140-2** may be electrically connected to another pad.

The connection part **126*a* included in the shield layer 126 may be electrically connected to the first pad 155L. The connection part 126*a* may partially overlap the first pad 155L when viewed in the direction perpendicular to the substrate 111. For example, when viewed in the direction perpendicular to the substrate 111, the connection part 126*a* may not overlap another pad to suppress electrical interference with another pad. For example, the connection part 126*a* may not be electrically connected to another pad. Alternatively, the connection part 126*a* may be electrically connected to another pad. Because the first signal line 140-1 and the second signal line 140-2 may be electrically connected by the same shield layer 126, the first signal line 140-1 and the second signal line 140-2** may be lines that apply the same signal.

Figure 11:
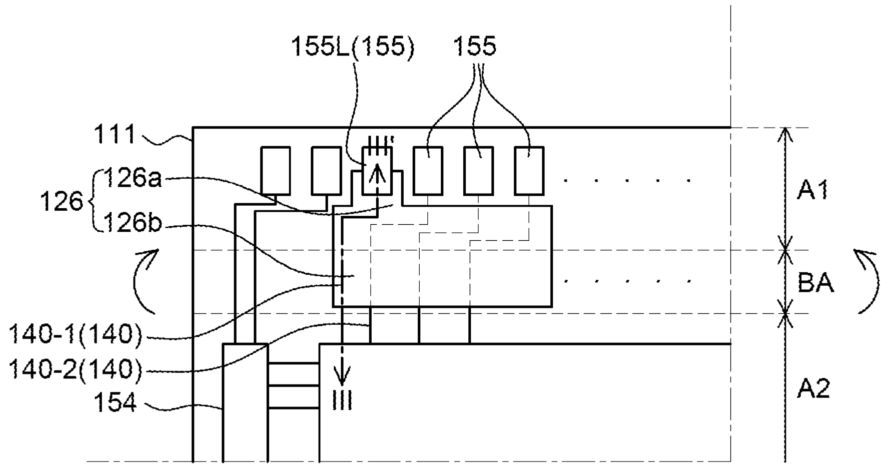
FIG. 11 is a top plan view of a part of a display device according to a third embodiment of the present specification.

FIG. 11 is a top plan view of a part of a display device according to a third embodiment of the present specification.

FIG. 11 schematically illustrates a part of the display device of the third embodiment of the present specification while focusing on the shield layer 126.

For reference, the description of the configurations identical to or duplicative of those described above with reference to FIG. 11 may be omitted.

With reference to FIG. 11, the plurality of lines may include a third signal line and a fourth signal line in addition to the first signal line 140-1 and the second signal line 140-2. The first signal line 140-1 to the fourth signal line may be four lines disposed adjacent to one another when viewed in the direction perpendicular to the substrate 111. The first signal line 140-1 may be electrically connected to the first pad 155L, and the second signal line 140-2 to the fourth signal line may be electrically connected to another pads.

The connection part **126*a* included in the shield layer 126 may be electrically connected to the first pad 155L. The connection part 126*a* may partially overlap the first pad 155L when viewed in the direction perpendicular to the substrate 111. In this case, when viewed in the direction perpendicular to the substrate 111, the connection part 126*a* may not overlap other pads to suppress electrical interference with any other pads. For example, the connection part 126*a* may not be electrically connected to other pads in one embodiment. Alternatively, the connection part 126*a* may be electrically connected to other pads. Because the first signal line 140-1 to the fourth signal line may be electrically connected by the same shield layer 126, the first signal line 140-1** to the fourth signal line may be lines that apply the same signal.

Figure 12:
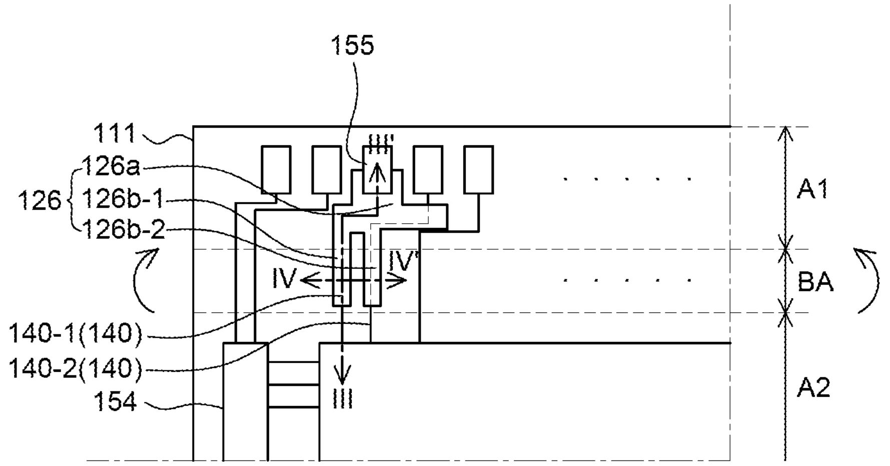
FIG. 12 is a top plan view of a part of a display device according to a fourth embodiment of the present specification.

FIG. 12 is a top plan view of a part of a display device according to a fourth embodiment of the present specification.

Figure 13:
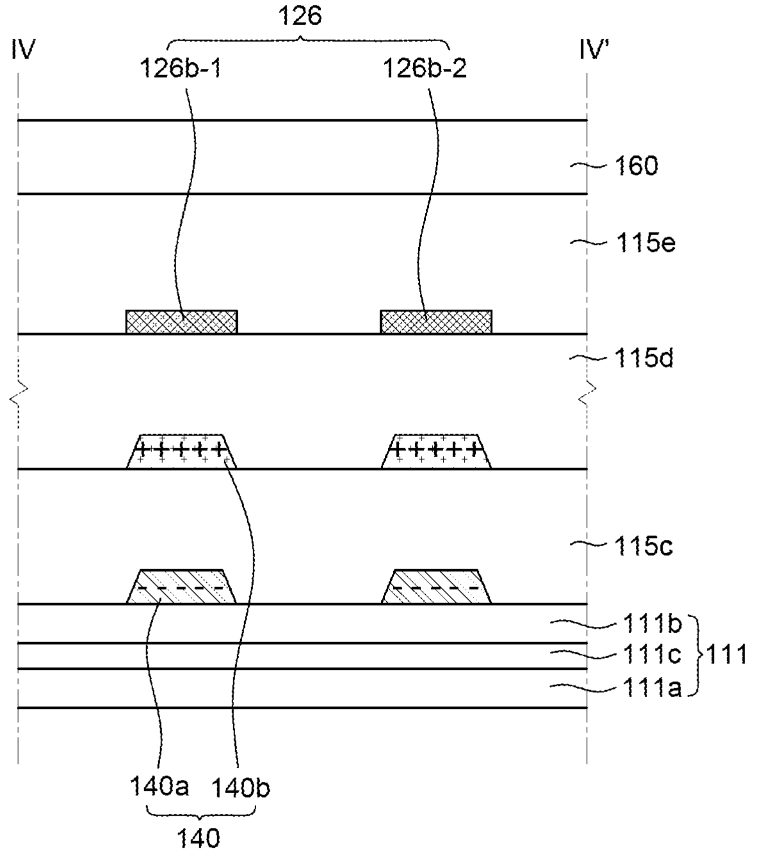
FIG. 13 is a cross-sectional view taken along line IV-IV' in FIG. 12.

FIG. 13 is a cross-sectional view taken along line IV-IV' in FIG. 12.

FIG. 12 schematically illustrates a part of the display device of the fourth embodiment of the present specification while focusing on the shield layer 126.

For reference, the description of the configurations identical to or duplicative of those described above with reference to FIGS. 12 and 13 may be omitted.

With reference to FIGS. 12 and 13, as in the above-mentioned embodiments, the shield layer 126 may include the connection part **126*a* and the shield part 126*b***.

For example, the shield part **126*b* included in the shield layer 126 may include a first shield part 126*b*-1 disposed on an upper portion of the first signal line 140-1 and configured to cover the first signal line 140-1, and a second shield part 126*b*-2 disposed on an upper portion of the second signal line 140-2 and configured to cover the second signal line 140-2**.

That is, the first shield part **126*b*-1 and the second shield part 126*b*-2 may protrude toward the bending area BA from the connection part 126*a*. When viewed in the direction perpendicular to the substrate 111, the first shield part 126*b*-1 and the second shield part 126*b*-2** may be spaced apart from each other.

For example, the first signal line 140-1 and the second signal line 140-2 may be two lines disposed adjacent to each other when viewed in the direction perpendicular to the substrate 111. The first signal line 140-1 may be electrically connected to the first pad, and the second signal line 140-2 may be electrically connected to another pad.

The connection part **126*a* included in the shield layer 126 may be electrically connected to the first pad 155L. The connection part 126*a* may partially overlap the first pad 155L when viewed in the direction perpendicular to the substrate 111. In this case, when viewed in the direction perpendicular to the substrate 111, the connection part 126*a* may not overlap another pad to suppress electrical interference with another pad. For example, the connection part 126*a* may not be electrically connected to another pad. Alternatively, the connection part 126*a* may be electrically connected to another pad. Because the first signal line 140-1 and the second signal line 140-2 may be electrically connected by the same shield layer 126, the first signal line 140-1 and the second signal line 140-2** may be lines that apply the same signal.

The exemplary embodiments of the present disclosure can also be described as follows:

According to an aspect of the present disclosure, there is provided a display device. The display device comprises a substrate comprising a display area and a non-display area, the non-display area comprising a bending area, a first area disposed at a first side of the bending area, and a second area disposed at a second side of the bending area, a plurality of pads disposed on an upper portion of the substrate in the first area and comprising a first pad, a circuit element configured to supply electric power at least to the first pad among the plurality of pads, a plurality of signal lines disposed on the upper portion of the substrate in the bending area and comprising a first signal line electrically connected to the first pad, the plurality of signal lines being electrically connected to the plurality of pads, respectively, a planarization layer configured to cover the plurality of signal lines and a shield layer disposed over the planarization layer and configured to at least cover the first signal line among the plurality of signal lines.

The shield layer may be electrically connected to the first pad.

The shield layer may comprise a connection part disposed over the substrate in the first area and electrically connected to the first pad and a shield part disposed over the substrate in the bending area, extending from the connection part to the bending area, and configured to at least cover the first signal line.

The display device may further include a second signal line disposed on the same layer as the first signal line and disposed at the periphery of the first signal line when viewed in a direction perpendicular to the substrate.

The shield part may cover the first signal line and the second signal line.

The shield part may comprise a first shield part disposed over the first signal line and configured to cover the first signal line and a second shield part disposed over the second signal line and configured to cover the second signal line.

The display device may further include a first conductive layer disposed over the substrate in the display area, an organic insulation layer disposed over the first conductive layer and a second conductive layer disposed between the organic insulation layer and the first planarization layer.

The first signal line may be disposed on the same layer as the second conductive layer and may comprise the same material as the second conductive layer.

The plurality of signal lines may further comprise a lower line disposed below the first signal line and insulated from the first signal line.

The first signal line may overlap the lower line when viewed in a direction perpendicular to the substrate.

The lower line may be disposed on the same layer as the first conductive layer and may comprise the same material as the first conductive layer.

The display device may further include a bank disposed over the shield layer and an upper layer disposed over the bank in the bending area and comprising ions therein.

The upper layer may constitute a micro-coating layer disposed over the plurality of signal lines in the bending area and made of photocurable resin.

The display device may further include a gate electrode disposed between the substrate and the first conductive layer and an inorganic insulation layer disposed between the gate electrode and the first conductive layer.

The display device may further include a first sub-line disposed over the substrate in the first area, configured to connect the first signal line and the first pad, and disposed on the same layer as the first conductive layer.

The display device may further include a second sub-line disposed between the substrate in the first area and the first sub-line, configured to electrically connect the first pad and the first sub-line, and disposed on the same layer as the gate electrode.

The organic insulation layer may comprise a first through-hole positioned in the first area, and the first signal line and the first conductive layer may be connected through the first through-hole.

The organic insulation layer may comprise a second through-hole positioned in the second area, and the first signal line and the first sub-line may be connected through the second through-hole.

The inorganic insulation layer may comprise a third through-hole positioned in the first area, and the first sub-line and the second sub-line may be connected through the third through-hole.

The shield layer may be connected to an electric current detection part, and the electric current detection part may detect a change in value of an electric current flowing in the shield layer.

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be understood that the above-described exemplary embodiments are illustrative in all aspects and do not limit the present disclosure. The protective scope of the present disclosure should be construed based on the following claims, and all the technical concepts in the equivalent scope thereof should be construed as falling within the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display device, comprising:

a substrate comprising a display area and a non-display area;

a bending area within the non-display area;

a first area disposed on a first side of the bending area;

a second area disposed on a second side of the bending area;

a plurality of pads disposed on an upper portion of the substrate in the first area;

a circuit element configured to supply electric power to a first pad among the plurality of pads;

a plurality of signal lines disposed on the upper portion of the substrate in the bending area, the plurality of signal lines being electrically connected to the plurality of pads, respectively;

a planarization layer configured to cover the plurality of signal lines; and a shield layer disposed over the planarization layer and configured to at least cover a first signal line among the plurality of signal lines, wherein the shield layer is electrically connected to the first pad.

2. The display device of claim 1, wherein the shield layer comprises:

a connection part disposed over the substrate in the first area and electrically connected to the first pad; and a shield part disposed over the substrate in the bending area, extending from the connection part to the bending area, and configured to at least cover the first signal line.

3. The display device of claim 2, further comprising:

a second signal line disposed on the same layer as the first signal line and disposed at the periphery of the first signal line when viewed in a direction perpendicular to the substrate.

4. The display device of claim 3, wherein the shield part covers the first signal line and the second signal line.

5. The display device of claim 4, wherein the shield part comprises:

a first shield part disposed over the first signal line and configured to cover the first signal line; and a second shield part disposed over the second signal line and configured to cover the second signal line.

6. The display device of claim 1, further comprising:

a first conductive layer disposed over the substrate in the display area;

an organic insulation layer disposed over the first conductive layer; and a second conductive layer disposed between the organic insulation layer and the first planarization layer.

7. The display device of claim 6, wherein the first signal line is disposed on the same layer as the second conductive layer and comprises the same material as the second conductive layer.

8. The display device of claim 6, wherein the plurality of signal lines further comprises a lower line disposed below the first signal line and insulated from the first signal line.

9. The display device of claim 8, wherein the first signal line overlaps the lower line when viewed in a direction perpendicular to the substrate.

10. The display device of claim 8, wherein the lower line is disposed on the same layer as the first conductive layer and comprises the same material as the first conductive layer.

11. The display device of claim 6, further comprising:

a gate electrode disposed between the substrate and the first conductive layer; and an inorganic insulation layer disposed between the gate electrode and the first conductive layer.

12. The display device of claim 11, further comprising:

a first sub-line disposed over the substrate in the first area, configured to connect the first signal line and the first pad, and disposed on the same layer as the first conductive layer.

13. The display device of claim 12, further comprising:

a second sub-line disposed between the substrate in the first area and the first sub-line, configured to electrically connect the first pad and the first sub-line, and disposed on the same layer as the gate electrode.

14. The display device of claim 13, wherein the organic insulation layer comprises a first through-hole positioned in the first area, and the first signal line and the first conductive layer are connected through the first through-hole.

15. The display device of claim 13, wherein the organic insulation layer comprises a second through-hole positioned in the second area, and the first signal line and the first sub-line are connected through the second through-hole.

16. The display device of claim 13, wherein the inorganic insulation layer comprises a third through-hole positioned in the first area, and the first sub-line and the second sub-line are connected through the third through-hole.

17. The display device of claim 1, wherein the shield layer is connected to an electric current detection part, and the electric current detection part detects a change in value of an electric current flowing in the shield layer.

18. A display device, comprising:

a substrate comprising a display area and a non-display area;

a bending area within the non-display area;

a first area disposed on a first side of the bending area;

a second area disposed on a second side of the bending area;

a plurality of pads disposed on an upper portion of the substrate in the first area;

a circuit element configured to supply electric power to a first pad among the plurality of pads;

a plurality of signal lines disposed on the upper portion of the substrate in the bending area, the plurality of signal lines being electrically connected to the plurality of pads, respectively;

a planarization layer configured to cover the plurality of signal lines;

a shield layer disposed over the planarization layer and configured to at least cover a first signal line among the plurality of signal lines;

a bank disposed over the shield layer; and an upper layer disposed over the bank in the bending area and comprising ions therein.

19. The display device of claim 18, wherein the upper layer constitutes a micro-coating layer disposed over the plurality of signal lines in the bending area and made of photocurable resin.

20. A display device, comprising:

a substrate having a display area and a non-display area;

a bending area between the display area and the non-display area;

a plurality of pads disposed on an upper portion of the substrate in the non-display area;

a circuit element configured to supply electric power to a first pad among the plurality of pads in the non-display area;

a plurality of signal lines disposed on the substrate in the bending area, the plurality of signal lines being electrically connected to the plurality of pads, respectively;

an insulation layer covering the plurality of signal lines; and a shield layer positioned over the insulation layer, the shield layer covering at least a portion of the plurality of signal lines, wherein the shield layer is electrically connected to the first pad.

21. The display device of claim 20 in which the portion covered by the shield layer is a portion of each signal line in the plurality of signal lines.

22. The display device of claim 20 in which the portion covered by the shield layer is a portion of at least one signal line of the plurality of signal lines.

23. The display device of claim 20 wherein the shield layer includes a metal layer and is positioned to shield the plurality of signal lines from an electric field.

* * * * *